E. Evans.
Hay Press.
Nº 85,808. Patented Jan. 12, 1869.
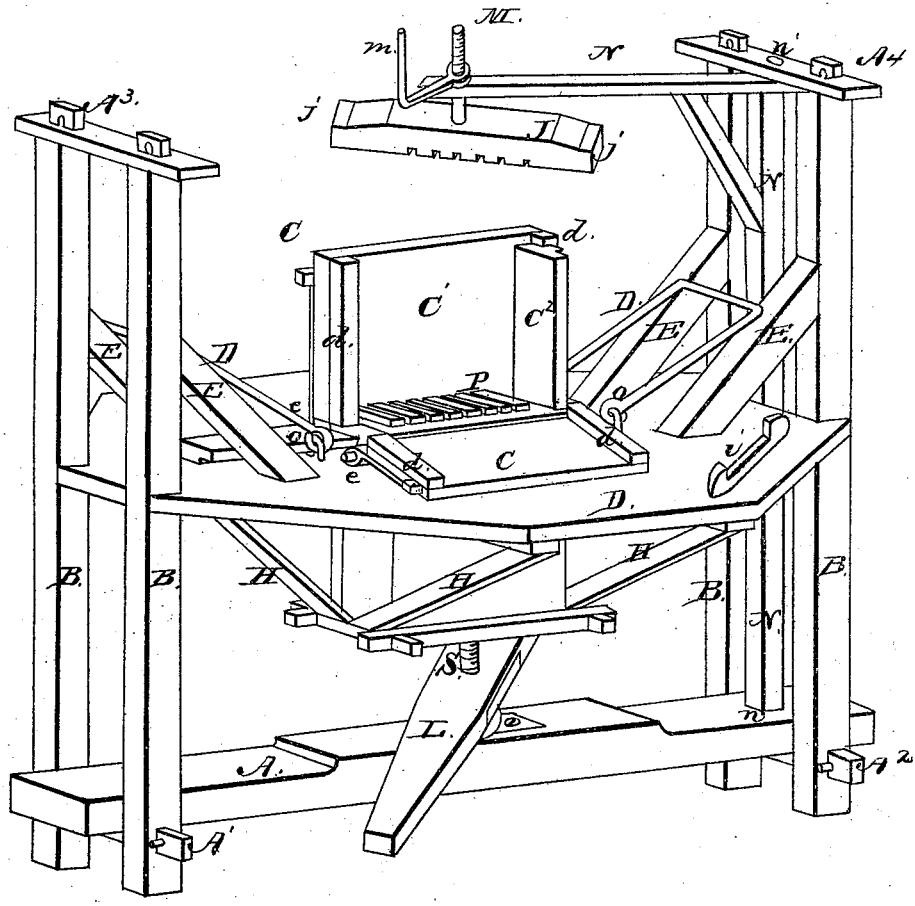
Witnesses:
C. A. Pettit
F. C. Beach
Inventor:
E. Evans
by Munn & Co
Attorneys.

ELIAS EVANS, OF MONTGOMERY, ALABAMA.

Letters Patent No. 85,808, dated January 12, 1869.

IMPROVED HAY AND COTTON-PRESS.

The Schedule referred to in these Letters Patent and making part of the same.

*To all whom it may concern:*

Be it known that I, ELIAS EVANS, of the city and county of Montgomery, and State of Alabama, have invented a new and improved Hay and Cotton-Press; and I do hereby declare that the following is a full, clear, and exact description of the construction and operation of the same, reference being had to the accompanying drawing, making a part of this specification, in which my invention is represented by a perspective view.

This invention relates to that class of hay and cotton-presses in which the bale is formed at the top of the press-box; and consists in an improved apparatus, by which the cover of the box can be swung out of or into place with greater convenience and dispatch than heretofore.

In the drawings—

A A$^1$ A$^2$ A$^3$ represent the horizontal timbers;

B, the vertical standards; and

E, the braces of the supporting-frame.

C is the press-box;

D, a platform, upon which the workmen stand while filling the press-box, or removing the bale therefrom; and H H, braces that steady the box.

The platen P is operated by a screw, S, worked by a lever, L, under the press-box.

The upper end of the press-box is composed of four leaves or doors, c c c' c', hinged to the main portion of the box at e e e, in such a manner that they can be opened, as shown on the front side in the drawing.

The end doors are kept from spreading and opening under the pressure of the cotton within, by means of the cleats a a, on the side doors; and the latter are, in their turn, kept in place by short notched stays or straps i i, hooked over projections on the ends of the side doors, and extending across from one side door to the other, outside of the box.

The top or cover J of the press-box, against which the cotton or hay is compressed by the action of the platen, is provided with a series of transverse grooves in its under side, to accommodate the bale-hoops, and is attached, by means of a screw-rod, M, to the horizontal arm of a crane, N, pivoted to the frame of the press at n n'.

m is a nut and lever, or crank, attached to the screw-rod, for the purpose of raising and depressing the cover J.

The ends of the cover, at j j, project beyond the box.

O O are two straps, of iron, or other suitable material, hinged to the platform or frame, at o o, and when the cover is on the box, passing over its projecting ends, in order to retain it in place, while it is subjected to the pressure from the platen below.

When the bale is to be removed from the box, throw the straps back, swing the cover out of the way, take off the stays i i, and open first the side doors, and then the end doors. The bale is then entirely exposed, and can be removed with the greatest ease.

The whole device is simple and inexpensive in construction, and exceedingly strong and durable, while, in quickness and convenience of operation, it is not excelled by any other screw-press heretofore brought into use.

Having thus described my invention,

What I claim as new, and desire to secure by Letters Patent, is—

In connection with a press, in which the platen operates upward, the arrangement of the swinging cover J, the crane N, pivoted to the frame of the press at n n', the screw-rod M, connecting the cover to the end of the crane, and the nut and lever m, by which the cover can be raised or depressed, the whole operating together as described, and for the purpose specified.

ELIAS EVANS.

Witnesses:
W. R. WILLIS,
W. H. NOBLE.